Jan. 3, 1939.    C. A. UPSON    2,142,463
DAMPING MEANS FOR AUTOMOBILE TOPS AND THE LIKE
Filed Nov. 10, 1937    2 Sheets-Sheet 1
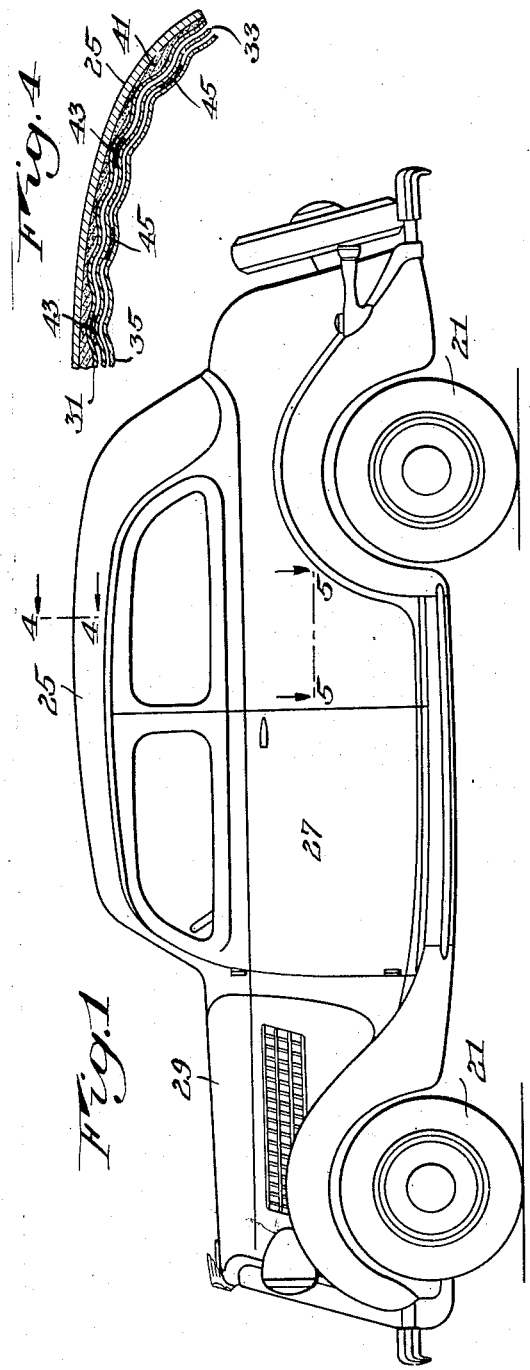
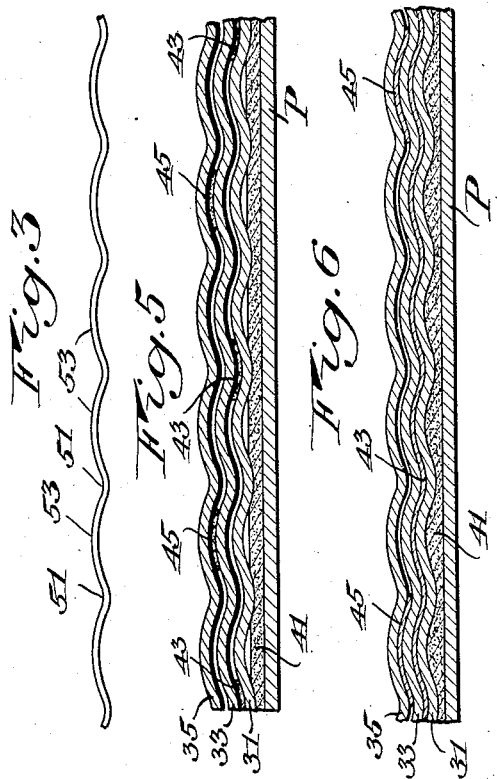
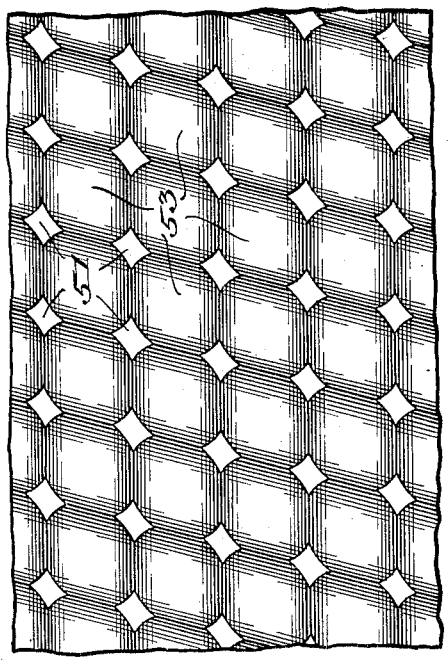
INVENTOR.
Charles A. Upson
BY Cumpston & Shepard
his ATTORNEYS Jan. 3, 1939.  C. A. UPSON  2,142,463
DAMPING MEANS FOR AUTOMOBILE TOPS AND THE LIKE
Filed Nov. 10, 1937   2 Sheets-Sheet 2
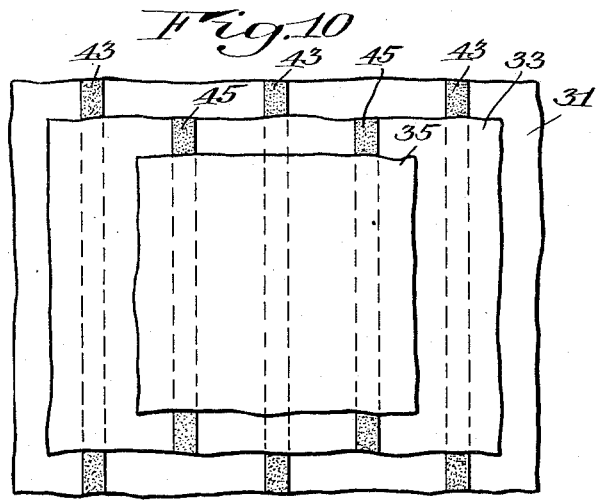
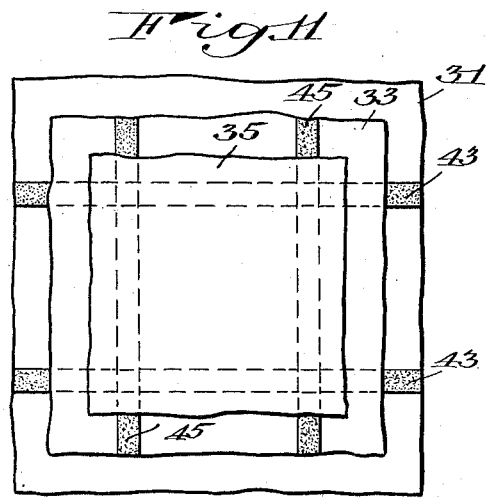
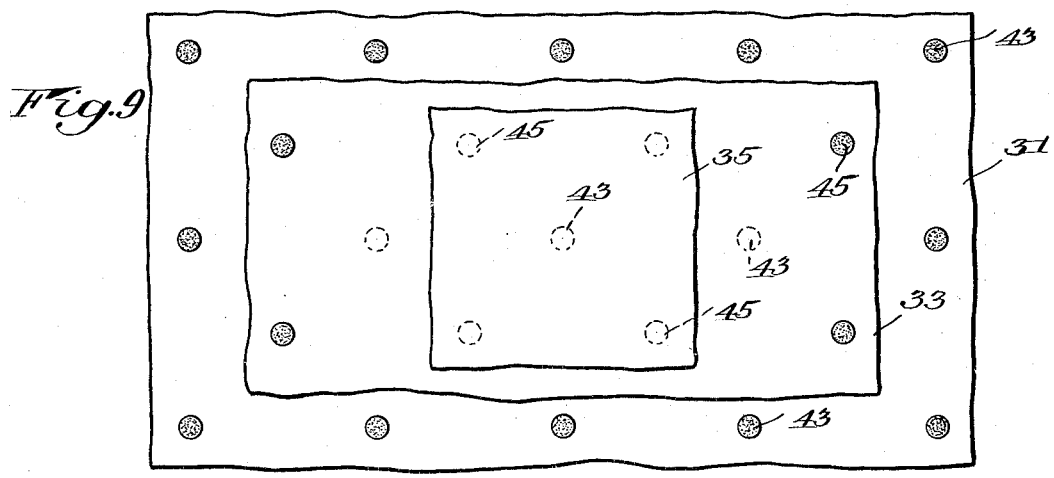
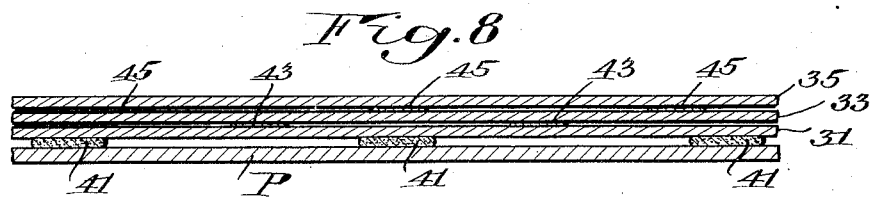
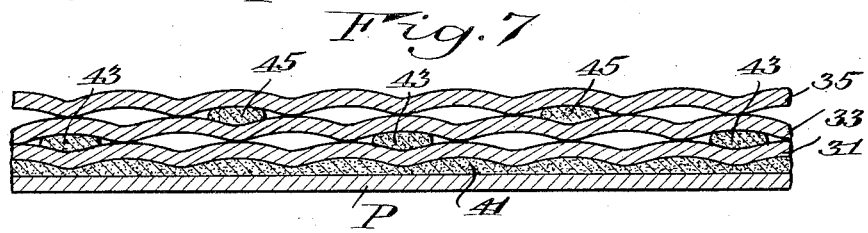
INVENTOR.
Charles A. Upson
BY Cumpston & Shepard
his ATTORNEYS Patented Jan. 3, 1939

2,142,463

UNITED STATES PATENT OFFICE 2,142,463

DAMPING MEANS FOR AUTOMOBILE TOPS AND THE LIKE

Charles A. Upson, Lockport, N. Y., assignor to The Upson Company, Lockport, N. Y., a corporation of New York Application November 10, 1937, Serial No. 173,822

11 Claims. (Cl. 296—137)

The present invention relates to means for damping the vibrations of automobile tops and other panels or systems subject to vibration, and has for its main object the provision of a generally improved and more satisfactory construction for damping such vibrations.

Another object of the invention is the provision of a construction particularly suitable for use on automobile roofs or tops, and capable of being bent readily to conform to the curvatures customarily found in such tops, or those of other vehicle body parts.

Still another object is the provision of damping means which is easy and inexpensive to construct and easy to install.

A further object is the provision of damping means of greater damping efficiency than previous damping means of equal weight.

A still further object of the invention is the provision of damping means having a thermal insulation efficiency greater than that of prior comparable damping means.

To these and other ends the invention resides in certain improvements and combinations of parts, all as will be hereinafter more fully described, the novel features being pointed out in the claims at the end of the specification.

In the drawings:

Fig. 1 is a side elevation of an automobile having damping means of the present invention applied thereto;

Fig. 2 is a diagrammatic face view of one of the embossed fibrous sheets preferably used in constructing the damping means;

Fig. 3 is a diagrammatic edge view of such a sheet;

Fig. 4 is a diagrammatic section taken substantially on the line 4—4 of Fig. 1, illustrating certain features of the invention as applied to an automobile roof;

Fig. 5 is a section taken substantially on the line 5—5 of Fig. 1 illustrating one embodiment of the invention as applied to a side panel or door panel of an automobile;

Fig. 6 is a view similar to Fig. 5 illustrating a different embodiment of the invention;

Fig. 7 is another view similar to Fig. 5 illustrating another modification of the invention;

Fig. 8 is also a view similar to Fig. 5 illustrating a further modification of the invention;

Fig. 9 is a diagrammatic face view of the damping construction, showing one arrangement of adhesive;

Fig. 10 is a similar diagrammatic face view illustrating a different arrangement of adhesive, and Fig. 11 is a similar diagrammatic face view showing still another modification of the adhesive.

The same reference numerals throughout the several views indicate the same parts.

In Fig. 1 of the drawings is shown an automobile including wheels 21 supporting a body having side walls 23, a top 25, doors 27, and motor hood sections 29. The exterior surfaces of the body parts, including the top or roof, preferably are formed of sheets or panels of metal, covered on their outer surfaces with suitable layers of enamel, lacquer, paint, or the like.

These metal sheets or panels of the automobile body are subject to vibration, originating partly from the travel of the vehicle over the road, and partly from the operation of the engine or other moving parts of the vehicle. Vibrations of the panels are objectionable because they create undesirable noises, because they tend to loosen nuts and weaken joints in the vehicle structure, and because of other reasons. The vibrations are particularly likely to occur in the top or roof of the automobile, because in the larger body styles (sedans, coaches, limousines, and the like) the top or roof usually constitutes the largest single unbroken or continuous approximately flat metallic panel of the whole vehicle.

The problem of damping the vibrations of the top panel and other parts of the vehicle is an important one, accentuated by the trend toward increasing travel speeds and engine speeds. Satisfactory damping of the top panel presents special difficulties, as compared with the side panels of the vehicle, because of the greater area of the top panel and greater likelihood of vibration therein, and also because any vibration damping material applied to the under side of the top panel will be arranged approximately horizontally, being subjected over substantially its whole area to the force of gravity tending to move it downwardly away from the top panel and to separate the plies from each other (if the damping material has more than one ply), which factor is not present to the same degree in damping materials applied to side panels or other approximately vertical panels of the vehicle. The present invention provides damping means especially suitable for top panels and admirably solves the problem of effectively damping vibrations in such panels without undue expense. The damping means of the present invention is suitable also for use in the side panels or other parts of a vehicle, or in other locations where vibrations of sheets or panels are to be damped.

Broadly stated, the present damping means includes two or more sheets secured to each other discontinuously or intermittently at spaced intervals, this assemblage of two or more sheets being placed substantially against or close to the panel whose vibrations are to be damped, and being secured thereto either continuously, or discontinuously at spaced intervals. Substantially continuous securing of the assemblage to the panel to be damped, by means of a continuous or substantially continuous layer of adhesive over a substantial area, is preferred, but not essential. The sheets or layers applied to the panel, and connected discontinuously or intermittently to each other, may be plain or embossed. Embossing is preferred, and may take the form of a multiplicity of small cavities or depressions and adjacent high spots or bumps, repeated over substantially the entire area of the sheet or layer. If embossed, adjacent sheets may be either in nested or in non-nested relationship to each other.

Whether embossed or not embossed, the adjacent sheets of the assemblage of two or more sheets are placed preferably but not necessarily in normally contacting relationship to each other. The sheets are preferably but not necessarily of non-metallic material, sheets of fibrous material being preferred, but not essential. Some of the advantages of the invention may be secured even when the sheets are of metal. All of the sheets need not be of the same material. Preferably, but not necessarily, some or all of the damping sheets are of material having a substantially different natural period of vibration from that of the panel to be damped.

While two sheets discontinuously secured to each other at spaced intervals and applied to the panel to be damped as above stated, fall within the scope of the present invention and give improved damping results, it is ordinarily preferred to use more than two sheets. When three or more sheets are employed, the connecting means securing the first sheet to the second sheet is preferably at least in part out of alinement with or offset with relation to the connecting means securing the second sheet to the third sheet, as this appears to give the best results, although the connecting means for all of the successive sheets may be wholly or partly alined with each other if desired. If a fourth sheet is used, the connecting means between the third and fourth sheets preferably is likewise at least partly offset from or out of alinement with the connecting means between the second and third sheets, and so on. The connecting means between successive sheets is preferably in the form of adhesive applied discontinuously (in dots or spots, lines or stripes) but may at times take the form of a non-adhesive connection, such as staples, rivets, eyelets, stitching or sewing, or similar means.

This arrangement of two or more layers of sheet material discontinuously or intermittently connected to each other and associated with the panel whose vibrations are to be damped, provides a structure having vibration damping efficiency superior to that obtained by the use of a single layer of sheet material similarly associated with the panel, or by the use of two or more layers continuously connected to each other and unable to move relatively to each other to a substantial extent, for the following reasons:

First, vibration causing deflection of the panel in a transverse direction (that is, in a direction having a component perpendicular to the plane of the panel) will tend to slide one layer of the sheet material over another layer thereof, in a direction approximately parallel to the plane of the panel. If, as is preferably the case, the layers are sufficiently close to each other, and if they have sufficient resistance to compression and elongation in their own planes so that sliding of the layers on each other will actually occur, rather than elongation, buckling, or similar deformation, this sliding will cause friction between the adjacent layers of the sheet material, which friction will dissipate some of the vibrational energy. The friction will be more pronounced if the layers of sheet material are embossed and are located in nested relation to each other, and less pronounced if they are plain or unembossed, or are embossed but not in nested relationship. Hence embossed layers in nested relation are preferred in order to obtain the greatest dissipation of energy by means of the friction caused by slippage of one layer over the other when the structure is flexed.

Second, any attempt of the panel to vibrate at a higher frequency than the natural frequency of vibration of that part of the area of one damping sheet which is between the points of attachment of this sheet to the panel or to a sheet continuously attached to the panel, will cause impacts between adjacent sheets during alternate half cycles of vibration. These impacts will absorb and dissipate vibrational energy, thus tending to damp the vibrations. For example, if the metal panel vibrates with a frequency higher than that of the free or unsecured areas of a damping layer or sheet discontinuously secured to the panel, then in that quarter of the complete cycle of vibration in which the metal panel moves from its neutral position in a direction away from the sheet, the metal panel will move faster than the sheet and widen the space between them in those areas between the connections. During the succeeding half cycle, the metal panel moves in a direction toward the damping sheet with a speed higher than that at which the sheet can normally move in free or unforced vibration, and thus narrows the space between the panel and the sheet, finally catching up with and impacting against those areas of the sheet which are between the discontinuous connections or securing means. In the final quarter of the cycle of vibration, as the metal panel moves toward its neutral or undeflected position, it will pull away from the damping sheet. The impacts are not necessarily regular, nor do they necessarily occur in each cycle of vibration, but, in general, for any normal combination of frequencies, there will be frequent impacts which will substantially aid in dissipating the vibrational energy. Where the first damping sheet or layer is connected to the metal panel continuously rather than discontinuously, vibrations of the first sheet will be forced to follow those of the panel, without impact therewith, but the above described impacts will occur between the first damping sheet and the second damping sheet, which is discontinuously connected to the first sheet. Impacts may also occur to some extent between the second and third damping sheets, or between more remote sheets of the series, depending on the degree to which the vibrations in the sheets closer to the vibrating panel are forced to occur at frequencies different from the natural frequencies of vibration of the vibrating areas of the sheets farther from the panel, which natural frequencies may be modified by the loading effect of still more remote sheets, or by other factors.

Third, the described construction of two or more damping sheets gives improved damping effectiveness in comparison to a single damping sheet having a weight equal to the total weight of the two or more sheets, because the splitting up of the total weight of sheet material into two or more layers discontinuously secured to each other results in reducing the stiffness or rigidity of the system without reducing the advantageous loading effect which the weight of these damping sheets has upon the metal panel. Loading a vibrating panel in general decreases its vibrational response, due to inertia effect of the load, and possibly other factors. If, however, the panel is loaded with a fairly thick homogeneous fibrous sheet, the stiffness or rigidity of the damping sheet may be sufficient so that the damping sheet itself constitutes essentially a responsive vibratory system. When the same weight of fibrous material is divided between two or more discontinuously connected layers, the loading effect on the metal panel is substantially the same, but the stiffness of the fibrous system is substantially less, so that it does not constitute a responsive vibratory system to a substantial degree nor increase the vibratory response of the metal plate. Other factors being equal, the stiffness of a sheet is a function of the cube or third power of its thickness, while the weight of the sheet is, of course, a function of the first power of its thickness. Thus a fibrous sheet having a thickness of 40 points (.040 inch) would have twice the weight of a 20 point sheet and eight times the stiffness or rigidity thereof, other factors being equal. But two 20 point sheets discontinuously connected to each other, while having twice the weight of a single 20 point sheet, would have a stiffness or rigidity of only about twice that of a 20 point sheet, instead of eight times that of a 20 point sheet. Thus, when using a plurality of thinner sheets, according to the present invention, instead of one thicker sheet, to obtain any desired degree of loading effect upon the metal panel, the combined rigidity or stiffness of the damping sheets becomes simply the sum of the stiffnesses of the individual thin sheets, and the mass of the combined system of damping sheets is the sum of the masses of the individual sheets, so that a desirable loading effect is obtained without undesirable stiffness.

Since these three ways in which damping is effected (sliding, impact, and loading) are not wholly dependent upon the character of the discontinuous connection between successive sheets of damping material, it follows that some or all of these advantages of the present invention may be secured when the several sheets are discontinuously fastened to each other or to the panel to be damped, by the staples, eyelets, stitches, etc., above mentioned. It is preferred, however, to secure the sheets to each other by means of discontinuous or intermittent adhesive, and to secure the first damping sheet to the panel to be damped, by adhesive, preferably but not necessarily continuous or substantially continuous over all or a large part of the common or overlapping areas.

An illustrative embodiment of the invention as applied to the roof panel 25 of the vehicle is shown in Fig. 4 of the drawings. A first damping sheet is indicated at 31, a second sheet at 33, and a third sheet at 35. Adhesive connecting the first sheet 31 to the panel 25 is indicated at 41, this being a continuous layer of adhesive in the present illustrative embodiment. Discontinuous or intermittent adhesive connecting the sheets 31 and 33 is shown at 43, and such adhesive connecting the sheets 33 and 35 is shown at 45.

As stated, this damping construction, although especially adapted for and useful on automobile roofs or tops, may also be used to advantage on back panels, side panels, (including doors), cowl panels, and hood sections, and floors of vehicle bodies, and on other panels subject to vibration. Several additional illustrative embodiments of the invention are shown in Figs. 5, 6, 7, and 8, in each of which the panel to be damped is indicated by the reference character P, and may represent the roof panel 25, or any of the other vehicle body panels or parts such as those above mentioned, or any other panel to be damped. In all of these Figs. 5 to 8, as in Fig. 4, three damping sheets are indicated at 31, 33, and 35, and any desired number of sheets more than one may be used. Adhesive connecting the panel P to the sheet 31 is shown at 41. Means discontinuously connecting the sheets 31 and 33 and the sheets 33 and 35, are shown at 43 and 45, respectively.

As stated, the damping sheets 31, 33, 35, etc., are of any suitable material, preferably but not necessarily nonmetallic. Fibrous sheet material is preferred. The fibrous sheet material may be woven textile material, such as cloth, but preferably is a paper-like product of substantial thickness, such as chipboard or other heavy paper having a thickness of, say, 15 points (0.015 inch), which has been found satisfactory in many cases though considerably thicker or thinner material may be used in many instances, depending on the characteristics of the material, the number of different sheets used, and other factors. Such a sheet exhibits substantial resistance to compression and elongation in the direction of its own general plane, sufficient so that when the panel flexes, the damping sheets will slip over the panel and over each other to some extent, instead of merely buckling or elongating and not slipping. Felt or felt-like materials may also be employed, made either from wood pulp fibers or rag fibers (hemp, jute, linen, cotton, rayon, etc.) or both, and preferably having a sufficient degree of resistance to compression and elongation in the plane of the material so that slippage will occur as above mentioned. If felt or felt-like material is employed, a somewhat greater thickness is preferably though not necessarily used, such as a thickness of, say, 30 points (0.030 inch), because of the soft and more flexible nature of the felt in comparison to an equal thickness of chipboard.

It is desirable that the material used for each damping sheet shall have a resistance to compression and elongation in the direction of its own plane which is of the order of that exhibited by a 15 point sheet of chipboard, but it preferably should not be so hard, brittle, or stiff, that it forms a resonant sheet or diaphragm readily responsive to vibrations or increases the vibratory response of the panel and damping structure as a whole. The preferred material, paper of about 15 points thickness, well fulfills all these conditions, and, when used for damping metal panels of the kind commonly employed for vehicle roofs and other parts of vehicle bodies, fits the further desirable qualification that its natural frequency of vibration is different from that of the panel being damped.

Some or all of the layers or sheets 31, 33, 35, 75 etc., may be plain, and some or all of them may be embossed. Plain unembossed sheets are shown in Fig. 8. Preferably all of them are embossed, such embossed sheets being shown in Figs. 4, 5, 6, and 7. The embossing may take any convenient form, one form giving good results being illustrated in Figs. 2 and 3, wherein the portions 51 represent depressions or cavities in one face of the material, while the portions 53 between these depressions 51 represent high spots, bumps, or elevations on this face. On the opposite face of the sheet there are high spots or bumps at points opposite the depressions or cavities 51 shown in Fig. 2, and there are depressions or cavities at points opposite the centers of the high spots or bumps 53 of Fig. 2. As will be noted from Fig. 2, the depressions or cavities 51 are alined with each other in two directions, but the lines or axes of embossing do not intersect at right angles, this feature being preferred but not essential.

When embossing is desired on more than one sheet, such sheets may be first individually embossed and then assembled and secured to each other, or may be first assembled and secured to each other and then collectively embossed, or a group of sheets may be collectively embossed without being fastened to each other, and then fastened, or then separated from each other and used as desired, in combination with other sheets or otherwise. When embossing is performed on the sheets before they have been secured to each other, the sheets may be assembled and secured either in nested relationship (as in Figs. 4, 5, and 6) or in non-nested relationship (as in Fig. 7). When embossing is performed on two or more sheets after they have been secured to each other, the resulting embossed sheets will be in nested relation to each other, with the bumps on one side of one sheet fitting at least partly into the cavities on the adjacent side of the next sheet, as shown for example in Figs. 4, 5, and 6. When thus embossed after being secured to each other, an intimate contact between the sheets is assured, which results in a maximum of friction during relative movement of adjacent plies, and maximum damping action of the frictional type described above.

If a non-nested relationship is desired, this may be accomplished by offsetting one sheet with respect to the next adjacent sheet by a fractional part of a pattern dimension in one direction or another, or by turning one sheet through an angle in its own plane relatively to the next adjacent sheet. When the axes of embossing in two directions in the plane of the sheet are not at a right angle to each other but at an angle substantially greater or less than a right angle, as in the preferred form shown in Fig. 2, it follows that if two sheets embossed with this same pattern are nested when they overlie each other in one position, they will not nest with each other if one of these sheets be turned 90° in its own plane relatively to the other, or if one sheet be turned upside down with relation to the other. Hence an embossing pattern in which the axes of embossing are not at 90° with each other, is advantageous in many cases when it is desired to place the sheets in non-nesting relationship, for it permits this relationship to be achieved readily by placing successive sheets at 90° to each other, or upside down with relation to each other, without that wastage which would occur at the corners of rectangular sheets if they had to be turned at 45° or some other angle less than 90° to each other, to produce non-nesting relationship, in sheets having embossing axes at 90° to each other. Alternatively, successive sheets may be embossed with different and non-nesting patterns, to achieve the non-nesting relationship, although embossing all sheets with the same pattern is preferred.

The intermittent or discontinuous connections between successive damping sheets, preferably of adhesive as already stated, may be arranged as a series of dots or spots of adhesive spaced from each other in two directions, as shown in Fig. 9 at 43 and 45, preferably with the connections 45, securing the sheets 33 and 35 to each other, offset from or out of alinement with the connections 43, securing the sheets 31 and 33 to each other, as shown. The same arrangement may be used when the connections are staples, rivets, eyelets, etc.

The discontinuous connections may also be arranged as a series of strips, stripes, or bands. The strips between any two adjacent damping sheets may be all parallel to each other, or may run in two directions at an angle to each other, like a gridiron or lattice work. Also the strips between two adjacent sheets may be parallel to or at an angle to the strips between another pair of adjacent sheets. Illustrative examples of these arrangements are shown in Figs. 10 and 11.

In Fig. 10, the strips 43 connecting the layers 31 and 33 are all parallel to each other and to the parallel strips 45 connecting the layers 33 and 35. This arrangement is preferred, as it permits the connecting strips to be readily applied to the sheets by means of rolls (when the connections are adhesive) or by means of sewing machines (when the connections are lines of stitching) while the sheets move continuously in a single direction. The strips 45 are preferably offset or out of alinement with respect to the strips 43, as shown.

In Fig. 11, the strips 43 connecting the layers 31 and 33 are all parallel to each other, and the strips 45 connecting the layers 33 and 35 are also parallel to each other, but the strips 45 are at a substantial angle (preferably approximately a right angle) to the strips 43. With this arrangement the strips 43 and 45 are offset or out of alinement with respect to each other throughout the major part of each strip, although they are in alinement with each other at the points where they cross. This same arrangement may be used whether the strips are of an adhesive character, or are lines of stitching, etc.

When the connections are in the form of adhesive dots or spots as indicated in Fig. 9, each dot or spot may conveniently be circular or polygonal and have a diameter of from ¼ inch to 2 inches, and successive dots connecting the same two sheets to each other may be spaced from 4 to 8 inches in each direction. When the connections are in the form of adhesive strips, each strip may have a width of from ¼ inch to 2 inches, and successive parallel strips may be spaced from 4 to 8 inches from each other. These dimensions are examples of those found to be satisfactory in practice, and are not intended as absolute limits. Connections in a form other than adhesive (staples, stitching, etc.) may be similarly spaced. When the damping sheets are applied to the under side of a vehicle roof or other approximately horizontal surface, the connecting means are preferably somewhat closer together than when the damping sheets are applied to an approximately vertical surface, in order to resist better the downward pull of gravity on the sheets, and prevent undesirable sagging and separation thereof between the spaced connecting means.

When adhesive is used as the connecting means between two sheets, it is preferably applied directly to the surfaces of one or both of the sheets, as indicated in Figs. 5 and 7. If spacing between successive sheets is desired under special circumstances, such spacing may be obtained by making the adhesive sufficiently thick, but the spacing should be relatively small, so that the sheets may readily contact with and be intimately associated with each other during vibration of the panel, as above explained.

Instead of placing the adhesive directly on the surfaces of one or both of the sheets which are to be connected by the adhesive, it may first be placed on opposite sides of an adhesive carrying member which is then interposed between the two sheets. The adhesive carrying member may be a circle, polygon, strip, or tape of any suitable material, such as paper, cloth, or metal. Such interposed members serve not only as carriers for the adhesive, to promote easy application thereof, but also, when in the form of strips or tapes, as reinforcing members (tensile members, when of paper, cloth, etc., and either tensile or compressive members, or having beam or bridging action, when of metal) to help support the damping sheets against sagging in the spaces between auxiliary supporting members, especially when the damping sheets are arranged approximately horizontally, as in automobile roofs, where it is frequently desirable that the top bows assist in holding the damping sheets against dislodgement by road shocks. When the connection between successive damping sheets is not an adhesive connection, such interposed members may be employed purely for their reinforcing effect, if desired, the connecting staples, rivets, stitching, etc., passing through or close to these interposed members. The dimensions and lateral spacing of the interposed members, whether used as adhesive carriers or not, may be approximately the same as the exemplary dimensions above given for corresponding spots or strips of adhesive applied directly to the damping sheets.

Such interposed members are indicated at 43 and 45 in Figs. 6 and 8. In Fig. 8 the representation of the members 43 and 45 applies equally to the spot form (like Fig. 9, for example), or to the strip form (like Fig. 10) when viewed in a direction parallel with the strips. In Fig. 6, the members 43 and 45 are represented as strips, 43 running in one direction and 45 in a direction approximately at right angles thereto (like the arrangement in Fig. 11, for example). In Figs. 9, 10, and 11, the elements 43 and 45 are intended to represent either adhesive applied directly to the damping sheets or adhesive applied to interposed members or adhesive carriers such as above described.

As already stated, certain of the damping effects produced by the disclosed construction are independent of the character of connection between the several sheets. Hence, if adhesive is used for connecting the sheets to each other, the adhesive may be of any desired kind or character, without destroying these damping effects. Preferably a permanently flexible adhesive is used, particularly if the damping material is to be applied as a unit, after the sheets are assembled and fastened to each other, to the sharply curved marginal edge portions around an automobile top, or to other sharply curved surfaces. The use of a permanently flexible adhesive, rather than one which is hard or brittle when set, insures that the assembly of connected sheets can be bent readily to conform to the curved surface to which the assembly is to be applied, without cracking or otherwise destroying the effectiveness of the adhesive, even if this bending and application do not take place until a substantial time interval after the several sheets have been assembled and adhesively secured to each other. As examples of suitable permanently flexible adhesives may be mentioned latex and rubber composition cements, and asphaltum base adhesives.

It is also preferable, though not essential, that the adhesive used in securing the damping sheets to each other be permanently tacky and plastic, and have a relatively low elastic limit, and low modulus of elasticity, both sufficiently low in proportion to the stiffness of the damping sheets in the directions of their own planes so that the sheets, during the vibration of the system, are able to strain or deform the interposed adhesive beyond the elastic limit. Such an adhesive produces an additional advantageous damping effect, beside the previously explained damping effects which are independent of the character of the adhesive or other connection. This additional effect is that when the structure flexes and when one of the damping sheets accordingly slides over an adjacent sheet, such sliding will deform the interposed adhesive because of its low modulus of elasticity and plastic nature. The deformation will strain the adhesive beyond its relatively low elastic limit when the slippage occurs in one direction, and the adhesive will not substantially tend to return to its initial undeformed shape but will tend to remain substantially in its deformed shape, thus requiring the expenditure of still further work or energy to restore the adhesive approximately to its initial shape when the damping sheet slides in the opposite direction during the next half cycle of vibration. The adhesive is, in effect, subjected to a shearing action, between the two sliding damping sheets.

The permanently tacky or sticky nature of the adhesive keeps it properly adhered to the sheets notwithstanding the vibration of the structure and the deformation of the adhesive, which otherwise might loosen the sheets from the adhesive. The extent of slippage of one sheet over another and the extent of deformation of the interposed adhesive may be exceedingly minute, but will be sufficient nevertheless to absorb substantial energy and help substantially to damp the vibrations.

An excellent adhesive having the above desirable characteristics of tackiness, plasticity, low modulus of elasticity, and low elastic limit, is an asphaltic base adhesive of high plasticity, such for example as that called "Dum-Dum." Such an adhesive also possesses the previously mentioned desirable characteristic of flexibility, and is the present preferred connecting means for securing the successive damping sheets to each other.

As stated, either adhesive or non-adhesive means may be used for securing the assembly of damping sheets to the panel to be damped. Preferably adhesive is used, the adhesive being shown at 41 in Figs. 4 to 8. It may be applied discontinuously as in spots, strips, etc., as indicated in Fig. 8, or it may be applied continuously, as shown in Figs. 4 to 7. If the sheet 31 nearest to the panel is embossed, the adhesive may fill substantially completely the cavities or depressions on the panel side of this sheet, as shown in Figs. 4, 6, and 7, or it may touch only the high areas of the sheet, leaving the low areas or bottoms of the cavities untouched or unfilled, as indicated in Fig. 5.

Preferably, but not necessarily, the adhesive 41 has the same characteristics of tackiness, plasticity, low modulus of elasticity, and low elastic limit above discussed in connection with adhesive for securing the damping sheets to each other. If it has these characteristics, the slipping of the first sheet 31 relatively to the panel during flexure will deform the adhesive (assuming sufficient stiffness in the sheet 31) in the same way above explained in connection with the adhesive between the sheets. This will absorb vibrational energy as above explained, and aid materially in damping vibrations. The preferred adhesive for fastening the damping sheets to the panel is the above mentioned asphaltic base "Dum-Dum."

The word "permanent" as applied to the characteristics of plasticity, tackiness, flexibility, etc., is intended to include materials having these characteristics for a substantial part of the useful life of the article to which the damping means is applied (say, for example, a couple of years or longer), even though these characteristics may ultimately disappear in a long time, or even before the entire useful life of the article is over.

Preferably the damping sheets are assembled and fixed to each other first, and then applied as a unit to the automobile roof or other panel with which they are to be used, the adhesive 41 being put either on the panel surface or the damping unit surface before the two are brought together. If desired, however, the damping sheets may be put on the panel one at a time, successive sheets being built up on those previously placed.

One or more of the damping sheets may be perforated with small perforations at intervals throughout its or their surfaces. Such perforations may interlock with and form a better bond with the adhesive, or may be useful in permitting ready escape of air when sheets are brought together or toward the panel, to prevent accidentally trapping air between the sheets themselves or between the first sheet and the panel.

When the damping sheets are of non-metallic material, such as fibrous material, one or more of the sheets may be impregnated with any suitable waterproofing or moisture resisting compound, or with any suitable fireproofing or fire resisting compound, or both. Such compounds suitable for fibrous material are well known, and any suitable compound or compounds may be employed in the present instance, subject however to the condition that the compound or compounds selected should not be such as to harden or stiffen the fibrous material to an undesirable degree which would increase the vibratory response of the system.

In most cases, that surface of the damping structure which is remote from the panel will be hidden from view by the interior lining or other trim of the automobile or other structure in which it is used. If this remote surface is to be exposed to view, however, it may be desired to provide it with an attractive surface or a surface capable of being rendered attractive. The exposed face of the innermost or exposed sheet of damping material may be prepared or treated in such a way that it will readily take, receive, or retain any suitable lacquer, flexible paint, enamel, or the like. Again, a layer of paper having in itself an attractive appearance or a design printed or painted thereon, or capable of receiving paint, lacquer, etc., may be placed over and adhesively or otherwise secured to the exposed face of the structure. Or again, if the structure is to be embossed after the application of a face layer instead of before the application thereof, the face layer may be in the form of a crepe paper, preferably a two-way stretch crepe paper, such as the material called "Corrucrepe" which will stretch in two directions and will not be perforated or otherwise damaged by the subsequent embossing operation.

If increased thermal insulation over that otherwise inherent in the structure is desired, one or more of the damping sheets may be made of or may be coated on one or both sides with metal foil having a bright shiny non-tarnishing or slow tarnishing surface, which will reflect back the radiant heat rays.

Any of the different kinds, forms, or arrangements of adhesive or other connecting means above disclosed may be used with any of the different kinds, forms, or arrangements of damping sheets above disclosed. The kind and form of connecting means used for securing one of the damping sheets to the panel or to another damping sheet, are not necessarily the same as those used for securing other damping sheets of the same structure to each other or to the panel. The accompanying drawings are to be understood as being diagrammatic, with some dimensions exaggerated for the sake of clearness, and as showing merely illustrative embodiments of the invention, and are not intended as limitations upon the many modifications and combinations which fall within the scope of the invention as above disclosed.

In addition to use on roof panels of automobiles, to which it is especially adapted as stated, the damping structure may be employed also on floors, rear, side, door, cowl, or hood panels of automobiles, or on various structures other than automobiles. For example, it may be used upon the walls or panels of a refrigerator cabinet, upon the walls or panels of any cabinet or casing containing moving machinery or otherwise likely to be set into vibration, upon the walls (whether metallic or non-metallic) of sound studios for motion picture production, walls of aircraft, water craft, railroad cars, etc.

The term "frictional contact" as used in the accompanying claims with respect to the action of two sheets relatively to each other, means either a rubbing contact or an impacting contact of one sheet against another, for both of these kinds of contacts produce friction which tends to damp vibrations, as above explained. The terms "self supporting" and "self sustaining", as used in the claims with reference to a sheet, unless otherwise qualified, mean that the sheet has sufficient tensile strength in relation to its weight so that a sheet of a size ordinarily used in damping a panel (for example, a sheet of about four feet square, or smaller) will support its own weight without breaking, if it be clamped along one edge to a support and be allowed to hang downwardly from the clamped edge. When a sheet is said to be sufficiently stiff to be self-supporting or self-sustaining throughout a given area, this means, of course, that if the sheet be placed approximately horizontally and supported only around the outline or perimeter of the given area, the part of the sheet within this supported outline or perimeter will support its own weight without unreasonable deflection or sagging.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. An automobile roof construction including a metallic roof panel, a layer of non-metallic sheet material secured thereto, a second layer of non-metallic sheet material, and means discontinuously connecting said second layer to said first layer so that there are substantial areas of said second layer which are not directly secured to said first layer and which are free to move away from and toward said first layer and in frictional contact therewith, both of said layers being sufficiently stiff to be self-supporting throughout the areas not directly secured to each other without substantial deflection in such areas due to the weight of the layers themselves, when arranged approximately horizontally.

2. A roof construction as described in claim 1, in which said non-metallic layers are of fibrous material.

3. A roof construction as described in claim 1, in which the first mentioned non-metallic layer is secured to said metallic roof panel by means of substantially permanently plastic tacky adhesive.

4. An automobile roof construction including a roof panel, a layer of fibrous sheet material on the under side thereof, a second layer of fibrous sheet material on the under side of said first mentioned layer thereof, both of said layers of sheet material being embossed with a multiplicity of closely spaced depressions and high spots throughout substantial parts of their areas, substantially permanently plastic tacky adhesive interposed between said roof panel and said first mentioned fibrous layer to secure them to each other, and adhesive interposed at spaced intervals between said two fibrous layers to secure them discontinuously to each other while leaving said two layers free to move relatively to each other and in frictional contact with each other in the areas between said spaced adhesive.

5. A roof construction as described in claim 4, in which said adhesive between said two fibrous layers is a flexible adhesive, so that the two fibrous layers after being adhesively secured to each other may be readily bent to conform to any reasonable curvature of said automobile roof panel without breaking or cracking said adhesive.

6. An automobile roof construction including a metallic roof panel, a first layer of non-metallic sheet material secured thereto, a second layer of non-metallic sheet material in overlying relation to said first layer, and means intimately connecting said second layer to said first layer discontinuously at spaced intervals, said two layers being sufficiently close to each other in the spaces between said connecting means so that said layers will rub on each other during vibration of said panel, and at least said second layer having substantial resistance to elongation, compression, and buckling, said resistance being sufficiently great so that a substantial part of the frictional forces produced by such rubbing will be transmitted along said layers to said connecting means to react against vibrational movement of said panel and tend to damp such movement.

7. A construction for automobile roofs and the like including a panel subject to vibration, a first layer of sheet material secured to said panel, a second layer of sheet material placed adjacent said first layer in overlying relation thereto, and means intimately securing said second layer to said first layer discontinuously at a plurality of spaced connecting locations, the areas of said second layer between said connecting locations being of such size and material as to have natural frequencies of vibration different from the natural frequency of vibration of the vibratory system comprising said panel and layers as a whole, said areas of said second layer being of substantial size sufficiently great so that during normal vibration of said vibratory system portions of said areas are likely to impact against and rub against said first layer, said second layer having substantial resistance to elongation, compression, and buckling, said resistance being sufficiently great so that a substantial part of the forces produced by such impact and rubbing will be transmitted along said layers to said securing means to react against vibrational movement of said system and tend to damp such movement.

8. Means for damping vibrations in a vehicle roof or other panel subject to vibrations, said means including a first layer of fibrous sheet material secured to the panel whose vibrations are to be damped, a second layer of fibrous sheet material in overlying relation to said first layer, and means intimately connecting said second layer to said first layer discontinuously at spaced intervals, said second layer having substantial stiffness and resistance to elongation and compression sufficiently great so that said second layer maintains itself in close proximity to said first layer in the areas between said spaced connecting means, to enable said areas of said second layer to impact and rub against said first layer during vibration of said panel, and sufficiently great so that the forces set up by such impact and rubbing will offer substantial resistance to vibration of said panel and tend to damp said vibration.

9. Means for damping vibrations in a vehicle roof or other panel subject to vibrations, said means including a first layer of fibrous sheet material secured to the panel whose vibrations are to be damped, a second layer of fibrous sheet material in overlying relation to said first layer, and means intimately connecting said second layer to said first layer discontinuously at spaced intervals, both of said layers being embossed with a multiplicity of closely spaced high areas and low areas, said areas on both of said layers being in mating and interengaged relation to each other, so that when the portions of said two layers between said connecting means tend to move relatively to each other during vibration of said panel, such movement will tend to produce a relatively high degree of friction between said two layers because of the interengaged relation of the embossing thereon, and such friction will absorb some of the energy of vibration and tend to damp the vibration.

10. Means for damping vibrations in a vehicle roof or other panel subject to vibrations, said means including a structural layer of sheet material the vibrations of which are to be damped, a plurality of layers of fibrous sheet material overlying each other and said structural layer throughout a substantial area, substantially permanently plastic tacky adhesive securing one of said fibrous layers to said structural layer, and means securing said fibrous layers to each other discontinuously at spaced intervals sufficiently far apart so that in one of said fibrous layers farther from said structural layer, the areas between the securing means securing it to the next adjacent fibrous layer closer to said structural layer may be capable of movement relatively to said next adjacent layer, to produce impact and rubbing against said adjacent layer during vibration of said panel, said one of said fibrous layers having sufficient stiffness and resistance to elongation, compression, and buckling so that a substantial part of the forces set up in said layer as a result of said impact and rubbing will be transmitted along said layer to said securing means to react against vibrational movement and tend to damp such movement.

11. Means for damping vibrations in a vehicle roof or other panel subject to vibrations, said means including a structural layer of sheet material the vibrations of which are to be damped, three layers of sheet material overlying each other and said structural layer throughout a substantial area, adhesive means securing said structural layer to that one of said layers of sheet material which is adjacent thereto, and means securing said three layers of sheet material to each other discontinuously at spaced intervals, at least part of the means for securing the first and second of said three layers to each other being offset from and out of alinement with the means for securing the second and third of said three layers to each other, the areas between the securing means securing adjacent layers to each other being of sufficient size with relation to the stiffness of the sheet material and the forces of vibration so that said forces will cause said areas of two adjacent layers to move relatively to each other in frictional contact with each other.

CHARLES A. UPSON.